United States Patent [19]

Mitsumune et al.

[11] Patent Number: 5,981,660
[45] Date of Patent: Nov. 9, 1999

[54] ISOCYANATE-CURING COATING MATERIAL AND METHOD FOR APPLICATION THEREOF

[75] Inventors: Shinji Mitsumune, Fujisawa; Taichi Okayama, Kamakura; Shinsuke Mochizuki, Asaka; Akihito Kobayashi, Kamifukuoka, all of Japan

[73] Assignees: NOF Corporation; Honda Giken Kogyo Kabushiki Kaisha, both of Tokyo, Japan

[21] Appl. No.: 08/895,263

[22] Filed: Jul. 16, 1997

[30] Foreign Application Priority Data

Jul. 19, 1996 [JP] Japan .................................. 8-190612

[51] Int. Cl.$^6$ .............................. C08L 75/04; C08F 8/30
[52] U.S. Cl. ...................... 525/123; 428/423.1; 525/374; 528/59
[58] Field of Search ..................................... 525/123, 374; 528/59; 428/423.1

[56] References Cited

U.S. PATENT DOCUMENTS

| | | | |
|---|---|---|---|
| 5,314,953 | 5/1994 | Corcoran et al. | 525/123 |
| 5,354,797 | 10/1994 | Anderson et al. | 525/123 |
| 5,731,382 | 3/1998 | Bederke et al. | 525/123 |

*Primary Examiner*—Fred Zitomer
*Attorney, Agent, or Firm*—Oblon, Spivak, McClelland, Maier & Neustadt, P.C.

[57] ABSTRACT

An isocyanate-curing coating material is disclosed which essentially consists of (A) an agent formed of a hydroxyl group-containing polymer having a weight average molecular weight in the range of 1000–20000 and (B) a polyisocyanate compound as a curing agent containing at least three isocyanate groups in the molecular unit thereof and having a weight average molecular weight in the range of 400–3000 and incorporating (A) the agent and (B) the curing agent in such amounts that the isocyanate groups in (B) the curing agent amounts to 0.5–2 equivalent weights per equivalent weight of the hydroxyl group in (A) the agent. A method for spray coating the isocyanate-curing coating material is also disclosed which comprises the steps of mixing (A) the agent with (B) the curing agent in a coating device, heating the resultant mixture therein to a temperature in the range of 35–80° C., and spraying the hot mixture directly on a given object with the coating device.

18 Claims, No Drawings

ISOCYANATE-CURING COATING MATERIAL AND METHOD FOR APPLICATION THEREOF

BACKGROUND OF THE INVENTION

1. Field of the Invention

This invention relates to an isocyanate-curing coating composition suitable for uses in automobile repair, coating of plastics, wood, building materials, and the like and a method for the application thereof. More particularly, this invention relates to a low-temperature grade isocyanate-curing coating material which excels in mechanical properties, physical properties such as weatherability and coating and finishing properties, and chemical properties and a method for the application of the coating material. The coating material of this invention, emits little organic solvent while being applied to a surface.

2. Prior Art Statement

The polyisocyanate-curing two-component urethane coating material is widely used as a low-temperature curing coating material with excellent coating properties. From the point of ensurounmental protection, however, it is important to decrease in the amount of organic solvent emitted from such coating materials during application a surface. This has led to the establishment of regulations such as Rule 66 in the United States of America, TA-LUFT in Germany, and prefectural ordinances in Osaka, Japan.

Since the two-component urethane coating materials comes under these regulations, so-called high-solid urethane coating materials are being developed which are high in solid components and emit little organic solvent during application. As a means to produce such coating materials conforming to these regulations, methods of reducing the molecular weights of hydroxyl group-containing polymers, isocyanate compounds, etc. have been tested.

Since these methods are merely aimed at reducing the molecular weights of existing polymers, the films formed of the coating materials produced by these methods are markedly poorer in such coating properties as mechanical property and weatherability than the films formed of the conventional coating materials. Among the methods for producing coating materials that achieve the object mentioned above is a method which comprises adding an organic solvent to a hydroxyl group-containing polymer and an isocyanate compound. Concerning this method, the feasibility of attaining a high-solid composition by adding a compound containing two or three hydroxyl groups in the molecular unit and having a molecular weight of several hundreds as a reactive diluent instead of adding the organic solvent has been also studied. The films formed of the compositions produced by these methods, however, are extremely inferior in such coating properties as mechanical property and weatherability to the films formed of the conventional coating materials and, therefore, are not practicable.

A known method of decreasing the amount of an organic solvent emitted from a coating material during its application to a surface is to lower the degree of dilution of the coating material with the solvent in preparation for the application to a surface. By this method, the coating material is diluted with an organic solvent to the optimum viscosity prior to the application and is then put to use. Specifically, this method consists in decreasing the amount of the diluting solvent to such an extent as to lower the viscosity in coating from the standard level of 5–25 seconds (the time required for a drop of the diluted coating material to fall from Ford Cup No. 4) to above 30 seconds. This is the easiest way of accomplishing a high-solid composition and cannot impair the coating properties because it does not alter the composition of solid components. Since the coating material of this method has high viscosity, however, it does not produce the perfect appearance sought in such applications as automobile repair and coating of plastics, wood and building materials for which the two-component urethane coating materials are widely used.

A high-solid two-component urethane coating material which is fully practicable remains yet to be developed.

The present inventors conducted a study with a view to developing a high-solid isocyanate-curing coating material which does not experience degradation of coating properties, such as mechanical properties, weatherability and the coat finishing property. As a result, they learned that an isocyanate-curing coating material experiences a peculiar phenomenon of abruptly falling in viscosity when its temperature thereof rises beyond 35° C. This invention was accomplished as a result.

SUMMARY OF THE INVENTION

This invention is directed to an isocyanate-curing coating material which comprises (A) an agent formed of a hydroxyl group-containing polymer having a weight average molecular weight in the range of 1000–20000 and (B) a polyisocyanate compound as a curing agent containing at least three isocyanate groups in the molecular unit thereof and having a weight average molecular weight in the range of 400–3000 and incorporating (A) the agent and (B) the curing agent in such amounts that the isocyanate groups in (B) the curing agent amounts to 0.5–2 equivalent weights per equivalent weight of the hydroxyl group in (A) the agent and to a method for spray coating the isocyanate-curing coating material which comprises the steps of mixing (A) the agent with (B) the curing agent in a coating device, heating the resultant mixture therein to a temperature in the range of 35–80° C., and spraying the hot mixture directly on a given object with the coating device.

PREFERRED EMBODIMENTS OF THE INVENTION

Concrete examples of the hydroxyl group-containing polymer in the (A) component to be used in this invention include acryl polyols and polyester polyols. These hydroxyl group-containing polymers may be used either singly or in the form of a combination of two or more members.

The acryl polyols are required to have a weight average molecular weight in the range of 1000–20000, preferably 3000–10000, and a hydroxyl group number in the range of 50–150. These acryl polyols each have as an essential monomer an acryl monomer possessed of a hydroxyl group and contain another acryl monomer and/or a vinyl monomer. These acryl polyols can be obtained by ordinary radical polymerization of these monomers.

Concrete examples of the monomer possessed of a hydroxyl group include (meth)acrylic hydroxyalkyl esters such as 2-hydroxyethyl methacrylate, 2-hydroxyethyl acrylate, hydroxypropyl methacrylate, hydroxypropyl acrylate, and 4-hydroxybutyl acrylate and lactone-modified α, β-ethylenically unsaturated monomers having 1–10 mols of a lactone such as ε-caprolactone or γ-butyrolactone added to (meth)acrylic hydroxyalkyl esters. Concrete examples of other acryl monomer and/or vinyl monomer include methyl (meth)acrylate, n-butyl (meth)acrylate, iso-butyl (meth)acrylate, tert-butyl (meth)acrylate, 2-ethylhexyl (meth)- acrylate, lauryl (meth)acrylate, styrene, and α-methyl styrene. The solution polymerization can be cited as one concrete example of the ordinary radical polymerization.

The polyester polyols mentioned above are required to have a weight average molecular weight in the range of 1000–20000, preferably 4000–10000, and a hydroxyl group number in the range of 50–150. Concrete examples of the monomer of which the polyester polyols are formed include phthalic anhydride, isophthalic acid, glycerin, and trimethylol propane.

If the weight average molecular weight of the hydroxyl group-containing polymer in the (A) component is less than 1000, the film formed of the coating material will be notably deficient in coating properties, particularly weatherability. If it exceeds 20000, the coating material will be high in viscosity, necessitating an increase in the amount of a solvent used for diluting the coating material prior to the application to a surface and causing an increase in the amount of an organic solvent emitted during the application of the coating material.

The polyisocyanate compound to be used as the (B) component in this invention is required to contain at least three isocyanate groups in the molecular unit thereof and have a weight average molecular weight in the range of 400–3000, preferably 500–1500. The polyisocyanate compound of this invention which enjoys excellent weatherability comprises hexamethylene diisocyanate (HMDI), isophorone diisocyanate (IPDI), hydrated-xylylene diisocyanate (H-XDI), xylylene diisocyanate (XDI), and meta-tetramethyl xylylene diisocyanate (TMXDI). These polyisocyanate compounds may be used either singly or in the form of a combination of two or more members.

If the weight average molecular weight of (B) the component is less than 400, the film obtained of the coating material will be notably deficient in coating properties, particularly weatherability, and in drying property. If it exceeds 3000, the coating material will have unduly high viscosity and tend to increase the amount of an organic solvent emitted during application to a surface.

In the isocyanate-curing coating material of this invention, the (A) component and the (B) component mentioned above are combined in such a ratio that the isocyanate groups in the (B) component may amount to 0.5–2 equivalent weights per equivalent weight of the hydroxyl group in the (A) component.

If the proportion of the (B) component is less than 0.5 equivalent weight, the film formed will have unduly low cross-link density and will be deficient in coating properties. If it exceeds 2 equivalent weights, the coating material, though excellent in coating properties, will not be completely practicable because of deficient film drying property.

Since this coating material is a high-solid coating material whose an organic solvent content is substantially limited to below 50% by weight (so as to reduce solvent emission during application), the film formed of this coating material by the standard coating method is so high in viscosity as to have an extremely inferior finished appearance. To preclude this problem, the coating material is applied by the method of coating contemplated by this invention as described hereinbelow.

The method of coating according to this invention comprises mixing the (A) component and the (B) component mentioned above in a coating device, heating the resultant mixture therein to a temperature in the range of 35–80° C., and directly spraying the hot mixture on a surface with the coating device.

If the temperature of the coating material resulting from mixing the (A) component and the (B) component does not reach 35° C., the viscosity of the coating material will not be satisfactorily lowered during the course of the application and, as a result, the amount of the organic solvent emitted during the application will not be decreased appreciably. If this temperature exceeds 80° C., addition reaction of the hydroxyl group to the isocyanate group will start and, as a result, the formed film will be inferior in smoothness and notably degraded in finish appearance.

The method of coating of this invention, therefore, defines the temperature of the coating material resulting from mixing the (A) component and the (B) component in the range of 35–80° C.

The coating material may be heated by any of the following four methods: a method which comprises heating only the (A) component and then mixing the (B) component therewith, a method which comprises heating only the (B) component and then mixing the (A) component therewith, a method which comprises heating the (A) component and the (B) component separately and then mixing them, a method which comprises mixing the (A) component and the (B) component and then heating the resultant mixture. Since the isocyanate-curing coating material which can be cured at a low temperature inherently has only a short pot life after the mixture of the components, this heating is liable to shorten the pot life further. The problem of short pot life can be practically eliminated by a method which comprises heating both or either of the (A) component and the (B) component and then homogeneously mixing the two components by the use of a two-component mixing device (such as, for example, a device called "Precision Mix" produced by Graco Corp). Specifically, the liquid tank A of Precision Mix is charged with the (A) component and the liquid tank B thereof with the (B) component and the liquid tank A is heated until the temperature of the content reaches 55° C. and the liquid tank B is meanwhile kept at normal room temperature. Then the (A) component and the (B) component are homogeneously mixed by the use of the two-component mixing device. As a result, the temperature of the mixture will reach 40° C. This procedure produces the same effect when the (A) component and the (B) component are reversed. It is more advantageous in this case to heat the (A) component than the (B) component, which may undergo self-polymerization. In this case, the short pot life poses no problem.

The method of coating of this invention, as described above, enables the isocyanate-curing coating material to be notably lowered in viscosity by heating to a temperature in the range of 35–80° C. As a result, the coating material can be applied in a high-solid state to a surface without requiring any dilution with an organic solvent. The amount of organic solvent emitted from the coating material during application can therefore be greatly decreased.

This effect is not observed with any other curing type coating material (such as, for example, a melamine-curing coating material). The reason this effect is obtained is that the isocyanate groups in the coating material are associated at a low temperature and, when the coating material is heated, they are severed from the association and are allowed to activate the molecular motion of the coating material and consequently lower the viscosity thereof.

Further, the film consequently formed of the coating material does not lose such coating properties as mechanical property and weatherability and the coat finishing property.

Now, the present invention will be described more specifically below with reference to working examples. It should be noted, however, that this invention is not limited in any sense by these working examples.

Production Example A

First, a hydroxyl group-containing polymer of the formulation shown in Table 1 below was prepared as the (A) component.

TABLE 1

| Reaction solvent: | Xylene | 20 parts |
|---|---|---|
| Vinyl monomer mixture: | | |
| Methyl methacrylate | | 21 parts |
| n-Butyl acrylate | | 21 parts |
| 2-Hydroxyethyl methacrylate | | 7.5 parts |
| Acrylic acid | | 0.5 part |
| Polymerization initiator: | Benzoyl peroxide | 4 parts |
| Diluting solvent: | Butyl acetate | 26 parts |
| Total | | 100 parts |

In a four-neck flask provided with a thermometer, a stirrer, a reflux condenser, and a dropping funnel, the reaction solvent was placed and heated in an atmosphere of nitrogen gas up to 135° C. over a period in the range of 30 minutes to one hour.

Next, the mixture of the vinyl monomer mixture with the polymerization initiator was added dropwise thereto over a period of two hours. After the dropwise addition was completed, the resultant mixture was stirred as kept at 135–140° C. for two hours. The reaction product consequently obtained, by the addition of the diluting solvent, was converted into Acryl Polyol A having a nonvolatile content of 50%.

On analysis by gel permeation chromatography, this Acryl Polyol A was confirmed to have a weight average molecular weight of 5000 (as reduced to polystyrene).

Next, a polyisocyanate compound containing at least three isocyanate groups in the molecular unit and having a weight average molecular weight of 700 (isocyanurate resulting from modification of 1, 6-hexamethylene diisocyanate produced by Sumitomo Bayer Urethane K. K. and marketed as "Desmodur N-3500") was used as the (B) component.

To the (A) component, the (B) component was added in such a gravimetric ratio that the amount of isocyanate groups in the (B) component amounted to 1 equivalent weight per equivalent weight of the hydroxyl groups of the (A) component. Coating Material A consequently produced represents a working example of this invention.

Production Examples B, D–G

Hydroxyl group-containing polymers of varying weight average molecular weights were produced as the (A) component by following the procedure of Production Example A. Polyisocyanate compounds containing at least three isocyanate groups in the molecular unit and having varying weight average molecular weights were used as the (B) component by following the procedure of Production Example A. The weight average molecular weights of the (A) component and the (B) component and the names of the polyisocyanate compounds of the (B) component are collectively shown in Table 2.

To the (A) components, the (B) components were added in such gravimetric ratios that the amounts of isocyanate groups in the (B) components amounted to 1 equivalent weight per equivalent weight of the hydroxyl groups of the (A) components. Coating Material B consequently produced represents a working example of this invention and Coating Materials D–G represent comparative examples.

Production Example C

A polyester polyol was produced as the (A) component as shown below.

First, a reaction vessel provided with a stirring device, a thermometer, a distillate separator, and an inert gas inlet tube was charged with the following components.

| Neo-pentyl glycol | 25.3 parts |
|---|---|
| Trimethylol propane | 6.0 parts |
| Adipic acid | 25.9 parts |
| Isophthalic acid | 14.3 parts |

These components were heated to 120° C. and then stirred and further heated to continue the ensuant reaction at 200° C. At intervals of 15 minutes, the reacting mixture was sampled in a small amount and assayed for acid number. After the acid number reached 15, the reacting mixture was cooled and then diluted with the following solvent. The total amount of the distilled water emanating from the reaction system was 18 parts.

| Xylene | 18 parts |
|---|---|
| Aromatic solvent ("Solvesso 150" produced by Esso K.K.) | 10.5 parts |

As a result, a polyester polyol having a nonvolatile content of 65% was obtained.

This polyester polyol, on analysis by gel permeation chromatography, was confirmed to have a weight average molecular weight of 5000 (as reduced to polystyrene).

Similarly to Production Example A, a polyisocyanate compound containing at least three isocyanate groups in the molecular unit and having a weight average molecular weight of 700 (isocyanurate resulting from modification of 1,6-hexamethylene diisocyanate, produced by Sumitomo Bayer Urethane K. K. and marketed as "Desmodur N-3500") was used as the (B) component.

To the (A) component, the (B) component was added in such a gravimetric ratio that the amount of isocyanate group in the (B) components amounted to one equivalent weight per equivalent weight of the hydroxyl groups of the (A) component.(See to Table 4.)

Production Examples H and I

Hydroxyl group-containing polymers of varying weight average molecular weights were produced as the (A) component by following the procedure of Production Example A. Polyisocyanate compounds containing at least three isocyanate groups in the molecular unit and having varying weight average molecular weights were used as the (B) component. The weight average molecular weights of the (A) component and the (B) component are collectively shown in Table 2.

To the (A) components, the (B) components were added in such gravimetric ratios that the amounts of isocyanate groups in the (B) components did not amount to 0.5–2 equivalent weights per equivalent weight of the hydroxyl groups of the (A) components. Coating Materials C consequently produced represent working examples of this invention and Coating Materials H–I represent comparative examples.

sample to a surface. The weight % of the organic solvent emitted during application of the coating material to a

TABLE 2

|  | Poduction Examples | | | | | | | | |
|---|---|---|---|---|---|---|---|---|---|
|  | Conforming to this invention | | | Not conforming to this invention (comparative examples) | | | | | |
|  | A | B | C | D | E | F | G | H | I |
| Weight average molecular weight of (A) component | 5000 | 6000 | 5000 | 30000 | 800 | 5000 | 5000 | 5000 | 5000 |
| Weight average molecular weight of (B) component | 700 | 1000 | 700 | 700 | 700 | 5000 | 300 | 700 | 700 |
| Equivalent weight of isocyanate group per equivalent weight of hydroxyl group | 1.0 | 1.0 | 1.0 | 1.0 | 1.0 | 1.0 | 1.0 | 0.2 | 3.0 |
| Name of polyisocyanate compound | Isocyanurate resulting from modification of 1.6 hexamethylene diisocyanate | | | | | | | | |

EXAMPLES 1–4 AND COMPARATIVE EXAMPLES 1–9

(1) Adjustment of Viscosity of Coating Material

Coating Materials A–I obtained in Production Examples A–I were heated to the relevant temperatures indicated in Table 3 and then subjected to adjustment of viscosity by addition thereto of a diluting solvent heated to one fixed temperature until the viscosity of 20 seconds determined by Ford Cup #4 was obtained.

surface is calculated from the following formula: "(Weight of organic solvent emitted during application to a surface)/(weight of coating material during application)×100". The results were invariably below 50% by weight in Examples 1, 2, 3 and 4.

Initial Hardness

A given test piece (film) immediately after drying was tested for initial hardness in accordance with JIS K-5400 (1979). For practical purpose, the initial hardness ought to be at least 2B.

TABLE 3

|  | | Example | | | | Comparative Example | | | | | | | | |
|---|---|---|---|---|---|---|---|---|---|---|---|---|---|---|
|  | | 1 | 2 | 3 | 4 | 1 | 2 | 3 | 4 | 5 | 6 | 7 | 8 | 9 |
| Production Example | Symbol | A | A | B | C | A | B | C | D | E | F | G | H | I |
| | Amount (parts by weight) | 100 | 100 | 100 | 100 | 100 | 100 | 100 | 100 | 100 | 100 | 100 | 100 | 100 |
| Temperature of coating material | | 40° C. | 60° C. | 50° C. | 50° C. | 10° C. | 10° C. | 10° C. | 50° C. | 50° C. | 50° C. | 50° C. | 50° C. | 50° C. |
| Diluting solvent (parts by weight) | | 10 | 5 | 15 | 20 | 50 | 70 | 50 | 50 | 0 | 30 | 0 | 20 | 0 |

(2) Formation of Test Piece and Evaluation of Coating Properties

Coating Materials A–I subjected to the adjustment of viscosity mentioned above were applied to ABS sheets, 70×120×3 mm, (produced by Sumitomo-Dow K. K. and marketed as "Clalastic MV") in such an amount as to form, on drying, a film 40 µm in thickness and then dried at 75° C. for 20 minutes to produce test pieces. The test pieces were rated for coating properties.

The coating properties were rated as follows. The test pieces immediately after the drying were tested for initial hardness. Then, the test pieces were left standing at normal room temperature for 72 hours and then subjected to the other tests. The results of the tests are shown in Table 4.

Weight % of organic solvent emitted during application:

A sample coating material having undergone the prescribed adjustment of viscosity was tested for nonvolatile content in accordance with JIS (Japanese Industrial Standard) K-5400 (1979) and the weight of the sample minus this nonvolatile content was reported as the weight of the organic solvent emitted during the application of the Resistance to Water A given test piece was kept immersed in hot water at 50° C. for 48 hours and then rated for the condition of coated surface on a two-point scale, wherein o stands for perfect absence of such defects as hazing, subdued gloss, and blisters (pass) and x for presence of any of the defects (fail).

Resistance to Flexion

This property was tested in accordance with JIS K-5400 (1979), 6.16, using a core bar, 10 mm in diameter at 20° C., and rated on a two-point scale, wherein o stands for absence of a crack on the coated surface and x for presence of a crack.

Accelerated Weatherability

This property, indicated by the ratio of retention (%) of the mirror face gloss of a sample found after 1000 hours' standing at 60°, "(Gloss after test)/(initial gloss) ×100", was determined in accordance with JIS K-5400 (1979), 6, 17, and rated on a two-point scale, wherein o stands for not less than 90% and x for less than 90%.

The method for the tests according to JIS K-5400 mentioned above will be briefly described below.

Weight % of Organic Solvent Emitted During Application

About 2 g of sample was heated at a temperature of 105° C. for three hours, and then the weight of a heating residue was measured. The difference between the weight of the sample and that of the heating residue was regarded as the weight % of the organic solvent emitted during application.

Initial Hardness

A sample immediately after being dried was flawed by pencils of various hardness using a pencil stretch testers. The hardness that did not flaw the sample was considered as the initial hardness.

Flexibility (Resistance to Flexion)

A sample was set on a bending tester to which a code bar whose diameter was 10 mm was attached, and was then bent at 180°. Cracks in a coated surface at the bent portion was visually evaluated.

Accelerated Weathering Test

A sample was tested for accelerated weathering by using a sunshine carbon arc type accelerated weathering machine.

TABLE 4

|  | Example | | | | Comparative Example | | | | | | | | |
| --- | --- | --- | --- | --- | --- | --- | --- | --- | --- | --- | --- | --- | --- |
|  | 1 | 2 | 3 | 4 | 1 | 2 | 3 | 4 | 5 | 6 | 7 | 8 | 9 |
| Amount of organic solvent, % by weight, emitted during application to a surface | 45% | 42% | 47% | 49% | 65% | 70% | 70% | 60% | 25% | 65% | 35% | 55% | 40% |
| Initial hardness | B | B | B | B | B | B | B | B | x 6B | B | x 4B | B | x 6B |
| Resistance to water | ○ | ○ | ○ | ○ | ○ | ○ | ○ | ○ | x | ○ | ○ | ○ | ○ |
| Resistance to flexion | ○ | ○ | ○ | ○ | ○ | ○ | ○ | ○ | x | ○ | ○ | x | ○ |
| Accelerated weatherability | ○ | ○ | ○ | ○ | ○ | ○ | ○ | ○ | x | ○ | x | x | ○ |

Table 4 clearly shows that the coating methods of Comparative Examples 5–9 using Coating Materials E–I failed to satisfy at least one of the requirements aimed at. The coating methods of Comparative Examples 1–4 which, in spite of the use of Coating Materials A and E, failed to give fully satisfactory heating suffered inevitable increases in the amount of the diluent solvent. In contrast, the coating methods of Examples 1–4 of this invention which used Coating Materials A and B and gave a heating to above 35° C. were confirmed to fulfill all the requirements fully satisfactorily.

The isocyanate-curing coating material which comprises (A) an agent formed of a hydroxyl group-containing polymer having a weight average molecular weight in the range of 1000–20000 and (B) a polyisocyanate compound as a curing agent containing at least three isocyanate groups in the molecular unit thereof and having a weight average molecular weight in the range of 400–3000 and incorporates (A) the agent and (B) the curing agent in such amounts that the isocyanate groups in (B) the curing agent amounts to 0.5–2 equivalent weights per equivalent weight of the hydroxyl group in (A) the agent is a novel isocyanate coating material which can be used in such applications as automobile repair and coating of plastics, wood and building materials.

A film excelling in mechanical property and weatherability can be obtained by mixing (A) the agent with (B) the curing agent in a coating device, heating the resultant mixture therein to a temperature in the range of 35–80° C., and spraying the hot mixture directly on a given object with the coating device. The coating material allows a decrease in the amount of organic solvent emitted during the application thereof to a surface.

What is claimed is:

1. An isocyanate-curing coating material, comprising (A) an agent formed of a hydroxyl group-containing polymer having a weight average molecular weight in the range of 1000–20000 and (B) a polyisocyanate compound as a curing, agent containing at least three isocyanate groups in the molecular unit thereof and having a weight average molecular weight in the range of 400–3000 and incorporating (A) said agent and (B) said curing agent in such amounts that said isocyanate groups in (B) said curing agent amounts to 0.5–2 equivalent weights per equivalent weight of the hydroxyl group in (A) said agent, wherein said hydroxyl group-containing polymer is at least one member selected from the group consisting of acryl polyols and polyester polyols, wherein said acryl polyol consists essentially of acryl monomers possessed of a hydroxyl group, an acrylic acid monomer, and at least one other monomer selected from the group consisting of acryl monomers not possessed of a hydroxyl group, and vinyl monomers, and wherein said acrylic acid monomer is present in an amount of about 1% by weight of said acryl polyol, and wherein said acryl monomers possessed of a hydroxyl group are present in an amount of about 15% by weight of said acryl polyol.

2. An isocyanate-curing coating material according to claim 1, wherein said acryl monomer possessed of a hydroxyl group is at least one member selected from the group consisting of 2-hydroxyethyl methacrylate, 2-hydroxyethyl acrylate, hydroxypropyl methacrylate, hydroxpropyl acrylate, 4-hydroxybutyl acrylate and lactone-modified α, β-ethylenically unsaturated monomers having 1–10 mols of a lactone added to (meth)acrylic hydroxyalkyl esters.

3. An isocyanate-curing coating material according to claim 1, wherein said acryl monomer not possessed of a hydroxyl group or said vinyl monomer is at least one member selected from the group consisting of methyl (meth)acrylate, n-butyl (meth)-acrylate, iso-butyl (meth)acrylate, tert-butyl (meth)acrylate, 2-ethylhexyl (meth)acrylate, lauryl (meth)acrylate, styrene, and α-methyl styrene.

4. An isocyanate-curing coating material according to claim 1, wherein said acryl polyol has a weight average molecular weight in the range of 3000–10000 and a hydroxyl group number in the range of 50–150.

5. An isocyanate-curing coating material according to claim 1, wherein said polyester polyol consists of at least one member selected from the group consisting of phthalic anhydride, isophthalic acid, glycerin, and trimethylol propane.

6. An isocyanate-curing coating material according to claim 1, wherein said polyester polyol has a weight average molecular weight in the range of 4000–10000 and a hydroxyl group number in the range of 50–150.

7. An isocyanate-curing coating material according to claim 1, wherein said polyisocyanate compound comprises at least one member selected from the group consisting of hexamethylene diisocyanate (HMDI), isophorone diisocyanate (IPDI), hydrated xylylene diisocyanate (H-XDI), xylylene diisocyanate (XDI), and meta-tetramethyl xylylene diisocyanate (TMXDI).

8. An isocyanate-curing coating material according to claim 1, wherein said polyisocyanate compound has a weight average molecular weight in the range of 500–1500.

9. The isocyanate-curing coating material according to claim 1, wherein the hydroxyl group-containing, polymer is an acryl polyol.

10. The isocyanate-curing coating material according, to claim 1, wherein the hydroxyl group-containing polymer is a polyester polyol.

11. A method of spray coating the isocyanate-curing coating material of claim 1 comprising the steps of mixing agent (A) with agent (B) in a coating device, heating the resultant mixture therein to a temperature in the range of 35–80° C. and spraying the hot mixture directly on an object with said coating device.

12. A method according to claim 1, wherein said acryl monomer possessed of a hydroxyl group is at least one member selected from the group consisting of such (meth) acrylic hydroxyalkyl esters as 2-hydroxyethyl methacrylate, 2-hydroxy-ethyl acrylate, hydroxypropyl methacrylate, hydroxy-propyl acrylate, and 4-hydroxybutyl acrylate and lactone-modified α, β-ethylenically unsaturated monomers having 1–10 mols of such a lactone as ε-caprolactone or γ-butyrolactone added to (meth)-acrylic hydroxyalkyl esters.

13. A method according to claim 1, wherein said acryl monomer not possessed of a hydroxyl group or said vinyl monomer is at least one member selected from the group consisting of methyl (meth)acrylate, n-butyl (meth)-acrylate, iso-butyl (meth)acrylate, tert-butyl (meth)acrylate, 2-ethylhexyl (meth)acrylate, lauryl (meth)acrylate, styrene, and α-methyl styrene.

14. A method according to claim 1, wherein said acryl polyol has a weight average molecular weight in the range of 3000–10000 and a hydroxyl group number in the range of 50–150.

15. A method according to claim 1, wherein said polyester polyol consists of at least one member selected from the group consisting of phthalic anhydride, isophthalic acid, glycerin, and trimethylol propane.

16. A method according to claim 1, wherein said polyester polyol has a weight average molecular weight in the range of 4000–10000 and a hydroxyl group number in the range of 50–150.

17. A method according to claim 1, wherein said polyisocyanate compound comprises at least one member selected from the group consisting of hexamethylene diisocyanate (HMDI), isophorone diisocyanate (IPDI), hydrated xylylene diisocyanate (H-XDI), xylylene diisocyanate (XDI), and meta-tetramethyl xylylene diisocyanate (TMXDI).

18. A method according to claim 1, wherein said polyisocyanate compound has a weight average molecular weight in the range of 500–1500.

* * * * *